(12) United States Patent  
Wu et al.

(10) Patent No.: US 9,660,515 B1  
(45) Date of Patent: May 23, 2017

(54) CONTROL METHOD AND CONTROL DEVICE FOR REDUCING SECOND-ORDER RIPPLE

(71) Applicant: NATIONAL CHUNG SHAN INSTITUTE OF SCIENCE AND TECHNOLOGY, Taoyuan (TW)

(72) Inventors: Chi-Sheng Wu, Taoyuan (TW); Chih-Hsien Chung, Taoyuan (TW); Hsuang-Chang Chiang, Miaoli (TW); Tsang-Li Tai, Miaoli (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 14/971,008

(22) Filed: Dec. 16, 2015

(51) Int. Cl.
*H02M 1/14* (2006.01)
*H02M 3/335* (2006.01)

(52) U.S. Cl.
CPC ......... *H02M 1/14* (2013.01); *H02M 3/33507* (2013.01)

(58) Field of Classification Search
CPC .................. H02M 1/14; H02M 3/33507
See application file for complete search history.

(56) References Cited

U.S. PATENT DOCUMENTS

| 8,009,446 B2* | 8/2011 | Chou .................... H02M 1/14 363/41 |
| 2007/0247877 A1* | 10/2007 | Kwon ................ H02M 3/3372 363/25 |
| 2016/0126863 A1* | 5/2016 | Ayai ....................... H02M 1/14 363/132 |

* cited by examiner

*Primary Examiner* — Jue Zhang
*Assistant Examiner* — Lakaisha Jackson
(74) *Attorney, Agent, or Firm* — Schmeiser, Olsen & Watts, LLP

(57) ABSTRACT

A control method for reducing second-order ripple is adapted to reduce second-order ripple on an input side of a DC-DC conversion device, wherein the input side of the DC-DC conversion device is coupled to a preceding voltage supply device, and an output side of the DC-DC conversion device is coupled to a DC-AC transforming device, characterized in that a voltage control device for controlling the preceding voltage supply device is designed according to a transfer function, and the transfer function is adjusted and controlled with an output voltage of the DC-DC conversion device and an amplitude voltage of pulse width modulation to reduce second-order ripple of an input voltage input to the input side of the DC-DC conversion device, thereby dispensing the need to increase circuits or increase capacitance of components and cutting costs.

4 Claims, 5 Drawing Sheets

CONTROL METHOD AND CONTROL DEVICE FOR REDUCING SECOND-ORDER RIPPLE

FIELD OF TECHNOLOGY

The present invention relates to control methods and control devices and more particularly to a control method and control device for reducing second-order ripple.

BACKGROUND

A two-level DC-DC converter series-connected to a DC-AC inverter is often for use in a system with plenty batteries or renewable power supply apparatuses parallel-connected to utility power. Since the virtual work thus produced is seldom absorbed completely by a DC-link in a two-level circuit, second-order ripple occurs to the voltage and input current on the input side of the DC-DC converter, thereby burdening the power components on the input side.

To solve the above problems, the prior art discloses increasing the capacitance level of a DC-link to render the DC-link more capable of absorbing the second-order virtual work and therefore reduce the second-order virtual work level which ends up on a DC input side or discloses increasing the capacitance level on the input side of a DC-DC converter to reduce input voltage ripple. Another conventional technique involves increasing a current loop in a DC-DC converter and reducing input voltage ripple with a current command generated from a voltage loop of an external loop or involves increasing ripple-absorbing circuits in use to thereby transfer the virtual work of the DC-link to the ripple-absorbing circuits, and in consequence the input side of the DC-DC converter does not produce any virtual work and therefore does not have any second-order ripple. However, the aforesaid techniques require increasing circuits or using components with high capacitance levels, thereby incurring high costs.

Accordingly, it is imperative to provide a control method and control device so as to overcome the drawbacks of the prior art.

SUMMARY

It is an objective of the present invention to provide a control method and control device for reducing second-order ripple without increasing circuits or the capacitance level.

In order to achieve the above and other objectives, the present invention provides a control method for reducing second-order ripple, so as to reduce second-order ripple on the input side of a DC-DC conversion device, wherein the input side of the DC-DC conversion device is coupled to a preceding voltage supply device, and the output side of the DC-DC conversion device is coupled to a DC-AC transforming device, characterized in that: a voltage control device for controlling the preceding voltage supply device is designed according to a transfer function, and the transfer function is adjusted and controlled with an output voltage of the DC-DC conversion device and an amplitude voltage of pulse width modulation to reduce second-order ripple of an input voltage input to the input side of the DC-DC conversion device.

In order to achieve the above and other objectives, the present invention further provides a control device for reducing second-order ripple, adapted to reduce second-order ripple on an input side of a DC-DC conversion device, wherein the input side of the DC-DC conversion device is coupled to a preceding voltage supply device, and an output side of the DC-DC conversion device is coupled to a DC-AC transforming device, characterized in that: the control device operates according to a transfer function, and the transfer function is adjusted and controlled with an output voltage of the DC-DC conversion device and an amplitude voltage of pulse width modulation to reduce second-order ripple of an input voltage input to the input side of the DC-DC conversion device.

In an embodiment of the present invention, the transfer function is expressed as:

$$H_P(S) = \frac{-\frac{2k_v V_d}{N v_{tm}} p}{1 + \frac{s}{Q\omega_0} + \frac{s^2}{\omega_0^2}(s+p)}, \omega_0 = \frac{1}{\sqrt{L_p C_p}}, Q = \frac{R_{pv}}{\omega_0 L_p},$$

wherein $k_v$ is a constant, and N, $V_d$ and $R_{pv}$ denote an internal coil ratio, output voltage and internal impedance of the DC-DC conversion device, respectively, $L_p$ and $C_p$ denote inductance and capacitance on the input side of the DC-DC conversion device, respectively.

In an embodiment of the present invention, the DC-DC conversion device is an active-clamped current source push-pull conversion device.

In an embodiment of the present invention, the preceding power supply device is a photovoltaic battery device.

Therefore, a control method and control device of the present invention is characterized in that: a voltage control device is designed according to a special transfer function in a manner that the transfer function is adjusted and controlled with the output voltage of a DC-DC conversion device and the amplitude voltage of pulse width modulation to reduce second-order ripple of the input voltage input to the input side of the DC-DC conversion device without increasing the circuits or increasing the capacitance level of components, thereby incurring low costs advantageously.

BRIEF DESCRIPTION

Objectives, features, and advantages of the present invention are hereunder described in detail and illustrated with specific embodiments in conjunction with the accompanying drawings, in which.

DETAILED DESCRIPTION

Figure 1:
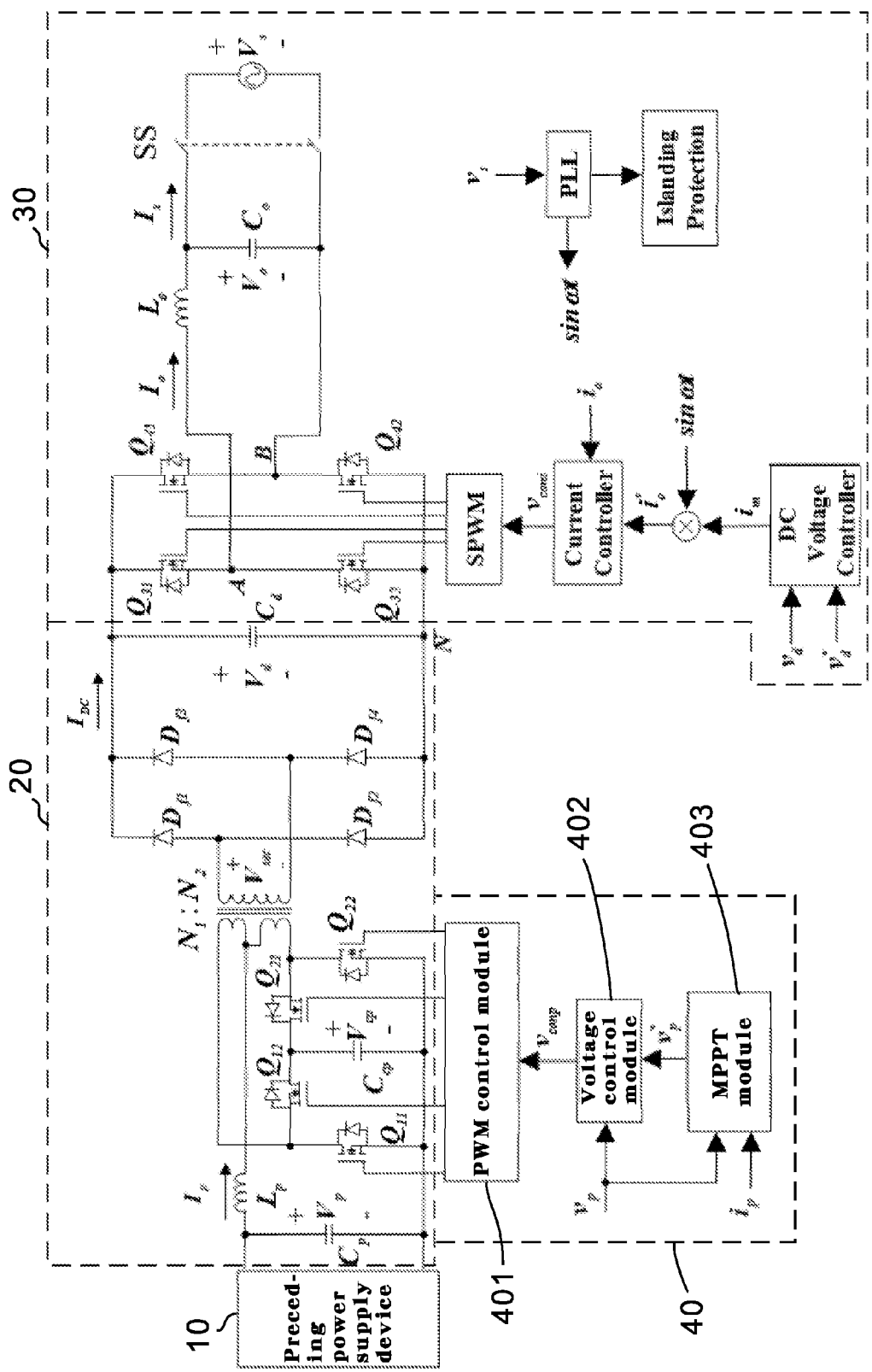
FIG. 1 is a schematic view of a two-level network-merge power generation system according to an embodiment of the present invention.

FIG. 1 is a schematic view of a two-level network-merge power generation system according to an embodiment of the present invention. The network-merge power generation system comprises a preceding power supply device 10, a DC-DC conversion device 20, a DC-AC transforming device 30 and a control device 40.

The preceding power supply device 10 is a battery or a self-contained renewable power supply device. In this embodiment, the preceding power supply device 10 is a photovoltaic device (which brings about photoelectric conversion by photoelectric effect). The preceding power supply device 10 is coupled to the input side of the DC-DC conversion device 20.

The DC-DC conversion device 20 boosts or bucks an input voltage $V_p$ received on the input side and generates an output voltage $V_d$. In this embodiment, the DC-DC conversion device 20 is an active-clamped current source push-pull conversion device. Persons skilled in the art understand that the active-clamped current source push-pull conversion device has two primary transistors Q11, Q22 and two clamped transistors Q12, Q21. The duty cycle of the primary transistors Q11, Q22 is less than or larger than 0.5 such that the active-clamped current source push-pull conversion device can operate in a buck mode or boost mode. Switching the clamped transistors Q12, Q21 for the primary transistors Q11, Q22, respectively, is complementary.

The DC-AC transforming device 30 is coupled to the output side of the DC-DC conversion device 20 to convert output voltage $V_d$, which is output from the DC-DC conversion device 20, into AC voltage $V_s$ for use by a circuit at the next level.

The control device 40 comprises a pulse width modulation control module 401 and a voltage control module 402. The pulse width modulation control module 401 is coupled to the primary transistors Q11, Q22 of the DC-DC conversion device 20 to adjust and control the duty cycle of the primary transistors Q11, Q22. The voltage control module 402 is coupled to the pulse width modulation control module 401.

The pulse width modulation control module 401 adjusts and controls the primary transistors Q11, Q22 of the DC-DC conversion device 20 according to a control signal $V_{conp}$ which is output from the voltage control module 402 and a specific triangular wave amplitude of pulse width modulation such that the primary transistors Q11, Q22 have a specific duty cycle. The control signal $V_{conp}$, which is output from the voltage control module 402, analyzes the output voltage $V_d$ by retrieving output voltage $V_d$ of the DC-DC conversion device 20, to obtain an average output voltage $V_{d0}$ and a ripple output voltage $V_{d2}$, and calculate the control signal $V_{conp}$ according to the retrieved average output voltage $V_{d0}$ and ripple output voltage $V_{d2}$. The calculation of the control signal $V_{conp}$ is described in detail later.

The control device 40 further comprises a maximum power point tracking (MPPT) module 403 which is coupled to the voltage control module 402. Persons skilled in the art understand that the maximum power point tracking module 403 monitors and samples the output power by maximum power tracking technology to keep the preceding power supply device 10 at the optimal output point efficiently and therefore attain the maximum power point.

The present invention is hereunder described mathematically.

Referring to FIG. 1, the relation between the input end and the output end, which is obtained from the DC-DC conversion device 20, is as follows:

$$L_p \frac{dI_p}{dt} = V_p - 2(1-D)\frac{N_1}{N_2}V_d \tag{1}$$

wherein $L_p$ denotes the inductance on the input side of the DC-DC conversion device 20, wherein the inductance and the capacitance together ensure that the resultant input current ripple is small, D denotes the duty cycle of the primary transistors Q11, Q22, wherein $N_1$ and $N_2$ denote the coil number.

In the steady state, the input voltage to output voltage conversion ratio is calculated with formula (1):

$$\frac{V_d}{V_p} = \frac{N_2}{N_1}\frac{1}{2(1-D)} \tag{2}$$

When the duty cycle D equals 0.5, $$V_d = \frac{N_2}{N_1}V_p$$

is regarded as a nominal condition. When the duty cycle D is less than 0.5, the DC-DC conversion device 20 operates in a buck mode. When the duty cycle D is larger than 0.5, the DC-DC conversion device 20 operates in a boost mode.

Considering that the output voltage $V_d$ output from the DC-DC conversion device 20 includes second-order ripple caused by the AC output of the DC-AC transforming device 30, the output voltage $V_d$ is expressed as:

$$V_d = V_{d0} + V_{d2} \tag{3}$$

substitute formula (3) into formula (1) to obtain:

$$L_p \frac{dI_p}{dt} = V_p - 2(1-D)\frac{N_1}{N_2}(V_{d0} + V_{d2}) \tag{4}$$

Figure 2:
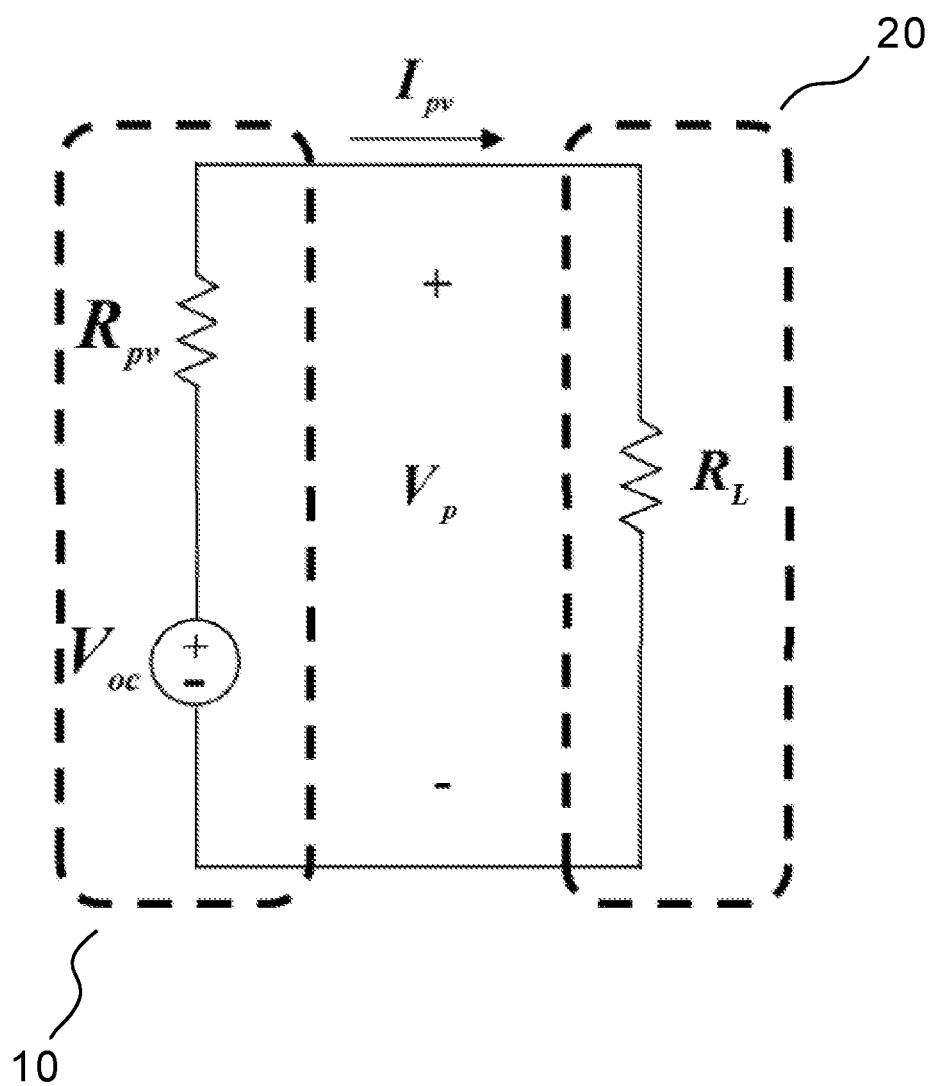
FIG. 2 is a schematic view of an equivalent circuit of a preceding power supply device according to an embodiment of the present invention.
Figure 3A:
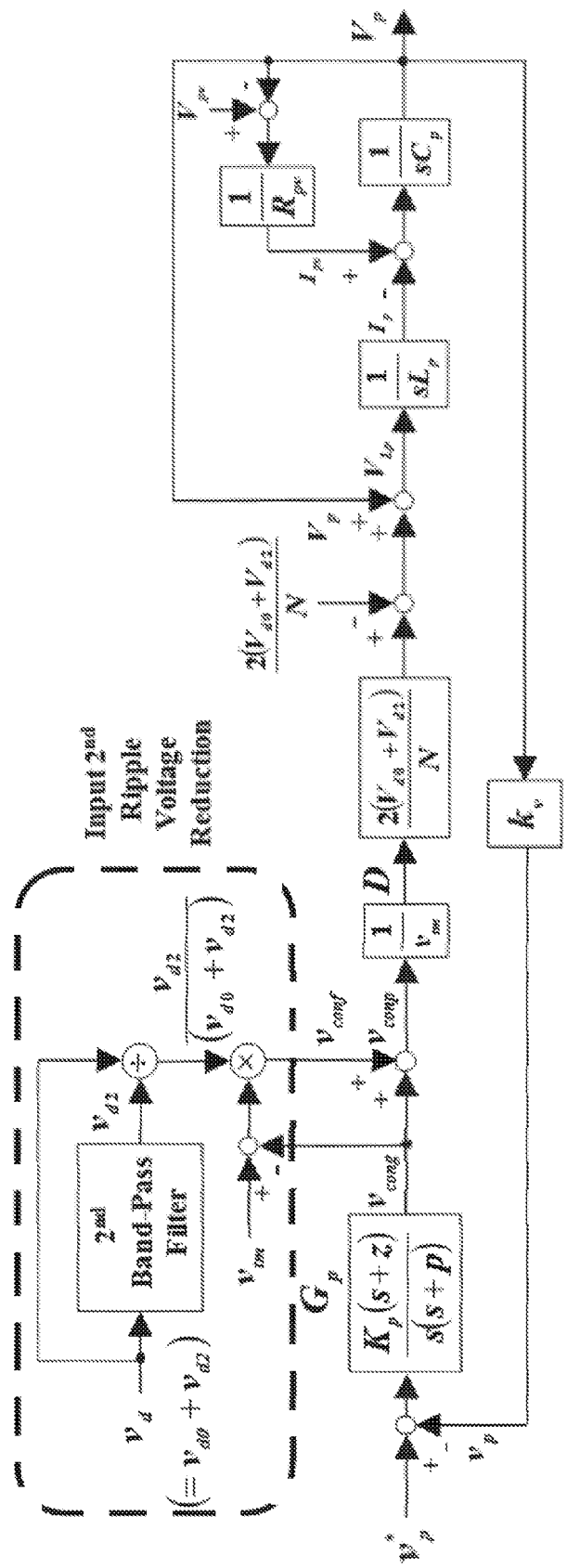
FIG. 3a and FIG. 3b are block diagrams of a control system according to an embodiment of the present invention.

Referring to FIG. 2, there is shown a schematic view of an equivalent circuit of a preceding power supply device according to an embodiment of the present invention. The present invention is illustrated with maximum power point tracking (MPPT), a incremental conductance method. According to the method, an equivalent circuit of the preceding power supply device 10 is depicted with FIG. 2, wherein the voltage output from the preceding power supply device 10 is expressed as:

$$V_p = V_{oc} - I_{pv}R_{pv} \tag{5}$$

wherein $V_{oc}$ denotes the open-circuit voltage of the preceding power supply device 10, $I_{pv}$ denotes the output current of the preceding power supply device 10, and $R_{pv}$ denotes the internal impedance of the preceding power supply device 10. The input side of the DC-DC conversion device 20 has features as follows:

$$C_p \frac{dV_p}{dt} = I_{pv} - I_p \tag{6}$$

wherein $C_p$ denotes the capacitance on the input side of the DC-DC conversion device 20. The control loop of the voltage output from the preceding power supply device 10 can be designed with formula (4) through formula (6), and its result is shown in FIG. 3a. FIG. 3a is a block diagram of a control system according to an embodiment of the present invention, wherein the second-order ripple controlling method is included and described below.

First, the duty cycle D is expressed as:

$$D = D_0 + D_2 \quad (7)$$

wherein $D_0$ denotes the average of the duty cycle D, $D_2$ denotes the duty cycle of second-order ripple. Formula (7) is substituted into formula (4) and expressed as:

$$L_p \frac{dI_p}{dt} = V_p - 2(1 - D_0 - D_2)(V_{d0} + V_{d2})/N \quad (8)$$

wherein $N = N_1/N_2$. In the steady state:

$$V_p = \frac{2(1 - D_0 - D_2)(V_{d0} + V_{d2})}{N} \quad (9)$$

To render the input voltage $V_p$ free of ripple, formula (9) must satisfy:

$$(1 - D_0)V_{d2} = D_2(V_{d0} + V_{d2}) \quad (10)$$

Therefore, the duty cycle D2 of the second-order ripple is specified as:

$$D_2 = (1 - D_0)\frac{V_{d2}}{V_d} \quad (11)$$

Referring to FIG. 3a, the method for reducing second-order ripple is designed according to formula (11). Regarding the second-order ripple shown in FIG. 3a, a band-pass filter retrieves voltage $V_{d2}$ of second-order ripple. Referring to FIG. 3a, $V_{tm}$ denotes triangular wave amplitude of pulse width modulation (PWM). The formula (11) in FIG. 3a is implemented with a forward control signal $V_{conf}$, and therefore the final duty cycle is expressed as:

$$D = D_0 + D_2 \quad (12)$$
$$D = \frac{v_{conp}}{v_{tm}} = \frac{v_{cong} + v_{conf}}{v_{tm}}$$
$$D_0 = \frac{v_{cong}}{v_{tm}}, \quad D_2 = \frac{v_{conf}}{v_{tm}}, \quad v_{conf} = (v_{tm} - v_{cong})\frac{v_{d2}}{v_{d0} + v_{d2}}$$

wherein $V_{cong}$ denotes the internal control signal of the voltage control module 402.

Figure 3B:
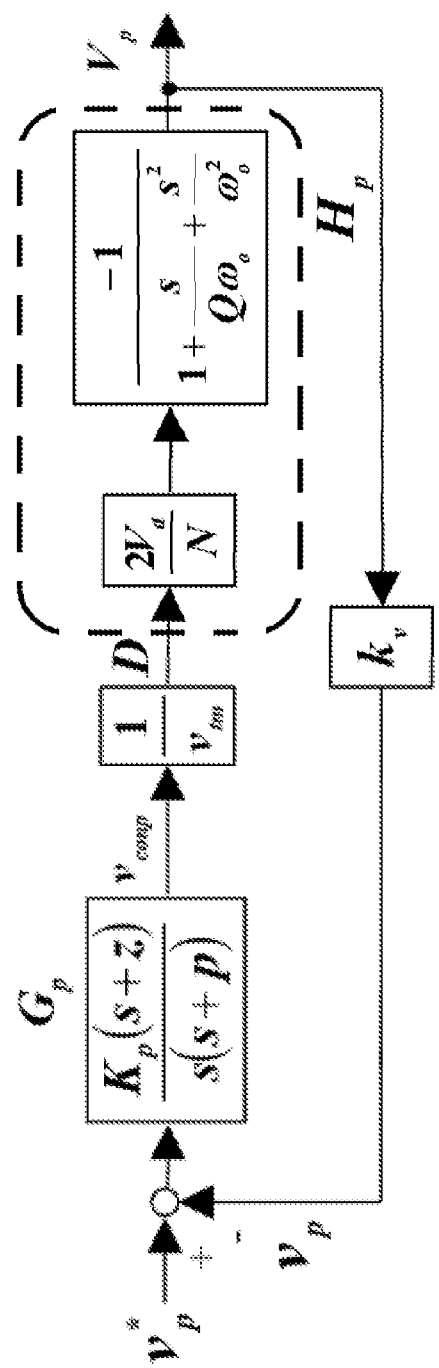

When voltage $V_{d2}$ of second-order ripple is eliminated, FIG. 3a can be simplified as FIG. 3b, wherein:

$$H_p(S) = \frac{v_p}{v_{conp}} = \frac{-\frac{2k_v V_d}{N v_{tm}} p}{1 + \frac{s}{Q\omega_0} + \frac{s^2}{\omega_0^2}(s + p)}, \quad (13)$$

$$\omega_0 = \frac{1}{\sqrt{L_p C_p}}, \quad Q = \frac{R_{pv}}{\omega_0 L_p}$$

wherein $k_v$ is a constant.

The voltage control module 402 of the preceding power supply device 10 is designed according to transfer function formula (13) such that the input voltage $V_p$ is free of second-order ripple. With the input voltage $V_p$ being free of second-order ripple, the bandwidth of the voltage control loop can increase to thereby speed up the tracking process performed with the maximum power point tracking module 403.

Figure 4:
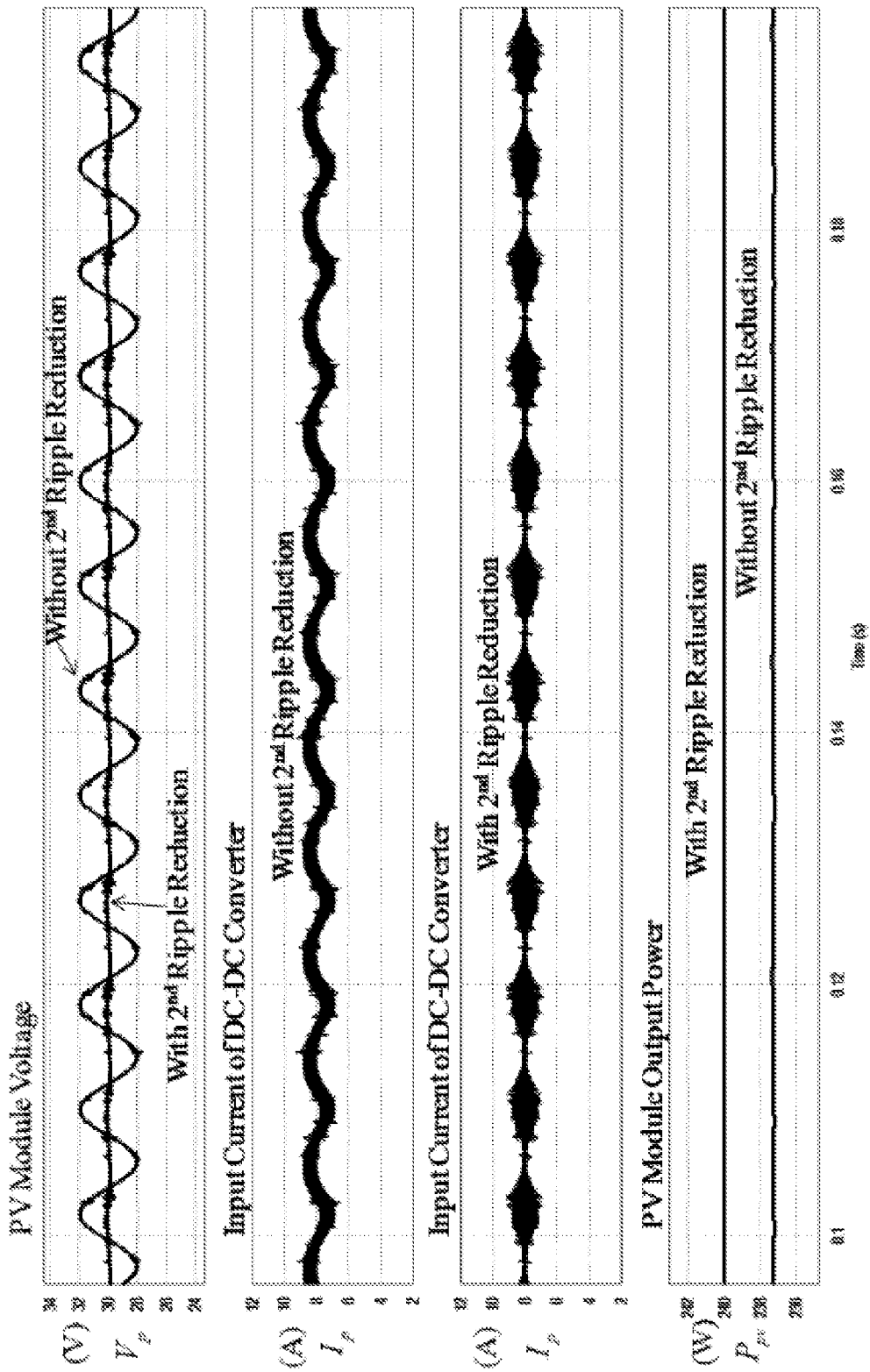
FIG. 4 shows graphs of experiment data according to an embodiment of the present invention.

Referring to FIG. 4, there are shown graphs of experiment data according to an embodiment of the present invention. In this embodiment, verification is performed with the DC-AC transforming device 30 which has an AC output of 110V at 240 W, wherein the specifications of the DC-DC converter 20 are expressed as follows:

$V_p$=25~42V, $v_{tm}$=5V, $V_d$=200V, $L_p$=25□H, $C_p$=47□F, N=3.1, $f_s$=50 kHz

The simulation result is shown in FIG. 4, which involves comparing the result of introducing the control method for reducing second-order ripple with the result of not introducing the control method for reducing second-order ripple (with remarks shown in the diagram) to verify the effectiveness of the method. The comparison shows that the control method for reducing second-order ripple is effective in reducing the second-order ripple of input voltage and current and indirectly increasing the power generation power from 237 W to 240 W.

Therefore, a control method and control device of the present invention is characterized in that: a voltage control device is designed according to a special transfer function in a manner that the transfer function is adjusted and controlled with the output voltage of a DC-DC conversion device and the amplitude voltage of pulse width modulation to reduce second-order ripple of the input voltage input to the input side of the DC-DC conversion device without increasing the circuits or increasing the capacitance level of components. Therefore, the control method and control device of the present invention incur low costs advantageously, increase the response speed and increase the power generation power.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A control method for reducing second-order ripple, adapted to reduce second-order ripple on an input side of a DC-DC conversion device, wherein the input side of the DC-DC conversion device is coupled to a preceding voltage supply device, and an output side of the DC-DC conversion device is coupled to a DC-AC transforming device, characterized in that:

a voltage control device for controlling the preceding voltage supply device is designed according to a transfer function, and the transfer function is adjusted and controlled with an output voltage of the DC-DC conversion device and an amplitude voltage of pulse width modulation to reduce second-order ripple of an input voltage input to the input side of the DC-DC conversion device;

wherein the transfer function is expressed as:

$$H_p(S) = \frac{-\frac{2k_v V_d}{N v_{tm}} p}{1 + \frac{s}{Q\omega_0} + \frac{s^2}{\omega_0^2}(s + p)}$$

-continued $$\omega_0 = \frac{1}{\sqrt{L_p C_p}}, Q = \frac{R_{pv}}{\omega_0 L_p}$$

wherein $k_v$ is a constant, and N, $V_d$ and $R_{pv}$ denote an internal coil ratio, output voltage and internal impedance of the DC-DC conversion device, respectively, $L_p$ and $C_p$ denote inductance and capacitance on the input side of the DC-DC conversion device, respectively.

2. A control device for reducing second-order ripple, adapted to reduce second-order ripple on an input side of a DC-DC conversion device, wherein the input side of the DC-DC conversion device is coupled to a preceding voltage supply device, and an output side of the DC-DC conversion device is coupled to a DC-AC transforming device, characterized in that:

the control device operates according to a transfer function, and the transfer function is adjusted and controlled with an output voltage of the DC-DC conversion device and an amplitude voltage of pulse width modulation to reduce second-order ripple of an input voltage input to the input side of the DC-DC conversion device wherein the transfer function is expressed as:

$$H_p(S) = \frac{-\frac{2k_v V_d}{N v_{tm}} p}{1 + \frac{s}{Q\omega_0} + \frac{s^2}{\omega_0^2}(s+p)}$$

$$\omega_0 = \frac{1}{\sqrt{L_p C_p}}, Q = \frac{R_{pv}}{\omega_0 L_p},$$

wherein $k_v$ is a constant, and N, $V_d$ and $R_{pv}$ denote an internal coil ratio, output voltage and internal impedance of the DC-DC conversion device, respectively, $L_p$ and $C_p$ denote inductance and capacitance on the input side of the DC-DC conversion device, respectively.

3. The control device of claim 2, wherein the preceding power supply device is a photovoltaic device.

4. The control device of claim 2, wherein the DC-DC conversion device is an active-clamped current source push-pull conversion device.

\* \* \* \* \*